United States Patent
Hui et al.

(10) Patent No.: US 9,698,867 B2
(45) Date of Patent: *Jul. 4, 2017

(54) DYNAMIC FRAME SELECTION WHEN REQUESTING TONE MAP PARAMETERS IN MESH NETWORKS

(71) Applicant: Cisco Technology, Inc., San Jose, CA (US)

(72) Inventors: Jonathan W. Hui, Belmont, CA (US); Wei Hong, Berkeley, CA (US); Jean-Philippe Vasseur, Saint Martin d'Uriage (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 138 days.

This patent is subject to a terminal disclaimer.

(21) Appl. No.: 14/522,580

(22) Filed: Oct. 23, 2014

(65) Prior Publication Data

US 2015/0063365 A1   Mar. 5, 2015

Related U.S. Application Data

(63) Continuation of application No. 13/960,622, filed on Aug. 6, 2013, now Pat. No. 8,879,613.

(51) Int. Cl.
*H04B 3/46* (2015.01)
*H04B 3/54* (2006.01)
*H04L 12/805* (2013.01)
*H04L 12/863* (2013.01)
*H04L 12/751* (2013.01)

(52) U.S. Cl.
CPC ............. *H04B 3/54* (2013.01); *H04L 47/365* (2013.01); *H04L 47/628* (2013.01); *H04L 45/02* (2013.01)

(58) Field of Classification Search
CPC .......... H04B 17/00; H04B 3/46; H04W 28/18
See application file for complete search history.

(56) References Cited

U.S. PATENT DOCUMENTS

| | | | |
|---|---|---|---|
| 5,515,509 A * | 5/1996 | Rom ....................... | H04L 29/06 709/228 |
| 6,590,905 B1 * | 7/2003 | Suumaki ................. | H04L 29/06 370/466 |
| 6,744,776 B1 * | 6/2004 | Kalkunte ............ | H04L 12/5693 370/395.41 |
| 6,859,463 B1 | 2/2005 | Mayor | |

(Continued)

*Primary Examiner* — Jean B Corrielus
(74) *Attorney, Agent, or Firm* — Johnson, Marcou & Isaacs, LLC

(57) ABSTRACT

In a multiple interface, low power and lossy network comprising a plurality of nodes, a sender node dynamically selects a data packet for setting a transmission parameter request in response to determining that an age value for a set of transmission parameters associated with a recipient device has expired or is expiring. The sender node selects an desired data packet for sending a transmission parameter request and transmits the selected data packet to the recipient device. The sender node receives a transmission parameter response from the recipient node comprising updated transmission parameters for that recipient node and then updates the current transmission parameters associated with the recipient node accordingly.

23 Claims, 8 Drawing Sheets

(56) References Cited

U.S. PATENT DOCUMENTS

| | | | |
|---|---|---|---|
| 6,987,778 B2* | 1/2006 | Sindhushayana | H04L 1/0003 370/394 |
| 7,032,153 B1* | 4/2006 | Zhang | H04L 1/0018 714/749 |
| 7,885,608 B2 | 2/2011 | Nilsson | |
| 8,879,613 B1 | 11/2014 | Hui | |
| 2003/0100267 A1* | 5/2003 | Itoh | H04B 17/382 455/69 |
| 2004/0153525 A1* | 8/2004 | Borella | H04L 29/06 709/217 |
| 2006/0079257 A1* | 4/2006 | Iochi | H04L 1/1887 455/517 |
| 2006/0094421 A1* | 5/2006 | Munje | H04W 76/022 455/427 |
| 2008/0056213 A1* | 3/2008 | Kao | H04W 48/14 370/338 |
| 2009/0213916 A1* | 8/2009 | Liu | H04L 12/2898 375/220 |
| 2010/0196506 A1 | 8/2010 | Gruzins | |
| 2010/0296506 A1 | 11/2010 | Ryu | |
| 2011/0182204 A1* | 7/2011 | Goto | H04W 28/18 370/252 |
| 2012/0093127 A1* | 4/2012 | Suzuki | H04W 28/18 370/331 |
| 2012/0117208 A1* | 5/2012 | Shaffer | H04L 29/12254 709/221 |
| 2012/0123631 A1 | 5/2012 | Schurov | |
| 2013/0080657 A1 | 3/2013 | Yamaguchi | |
| 2013/0163444 A1 | 6/2013 | Tee | |
| 2013/0188562 A1 | 7/2013 | Espina Perez | |
| 2013/0272347 A1* | 10/2013 | Merlin | H04B 7/0452 375/219 |

\* cited by examiner

DYNAMIC FRAME SELECTION WHEN REQUESTING TONE MAP PARAMETERS IN MESH NETWORKS

RELATED APPLICATIONS

This application is a continuation of U.S. patent application Ser. No. 13/960,622 filed Aug. 6, 2013, now U.S. Pat. No. 8,879,613, and entitled "Dynamic Frame Selection When Requesting Tone Map Parameters in Mesh Networks." The complete disclosure of the above-identified priority application is hereby fully incorporated herein by reference.

TECHNICAL FIELD

The present disclosure relates generally to computer networks and, more particularly, to improving the efficiency and effectiveness of transmitting transmission parameter update requests.

BACKGROUND

Constrained networks include, for example, Low power and Lossy Networks (LLNs), such as sensor networks. These constrained networks have a myriad of applications, such as Smart Grid, Smart Cities, home and building automation, etc. Various challenges are presented with LLNs, such as lossy links, low bandwidth, battery operation, low memory and/or processing capability, etc. Large-scale internet protocol (IP) smart object networks pose a number of technical challenges. For instance, the degree of density of such networks (such as Smart Grid networks with a large number of sensors and actuators, smart cities, or advanced metering infrastructure (AMI) networks) may be extremely high. For example, it is not rare for each node to see several hundreds of neighbors. This architecture is particularly problematic for LLNs, where constrained links can wreak havoc on data transmission.

Network deployments utilize a number of different link technologies, including RF, Powerline Communications (PLC), and cellular. Each link technology provides its own set of strengths and weaknesses. LLNs communicate over a physical medium that is strongly affected by environmental conditions that change over time. Some examples include temporal changes in interference (for example, other wireless networks or electrical appliances), physical obstruction (for example, doors opening/closing or seasonal changes in foliage density of trees), and propagation characteristics of the physical media (for example, temperature or humidity changes). PLC link technologies, for example, are known to experience significant unpredictable noise that depends on the quality of the electric lines and the kinds of electric devices attached to the network.

DESCRIPTION OF EXAMPLE EMBODIMENTS

Overview

Figure 1:
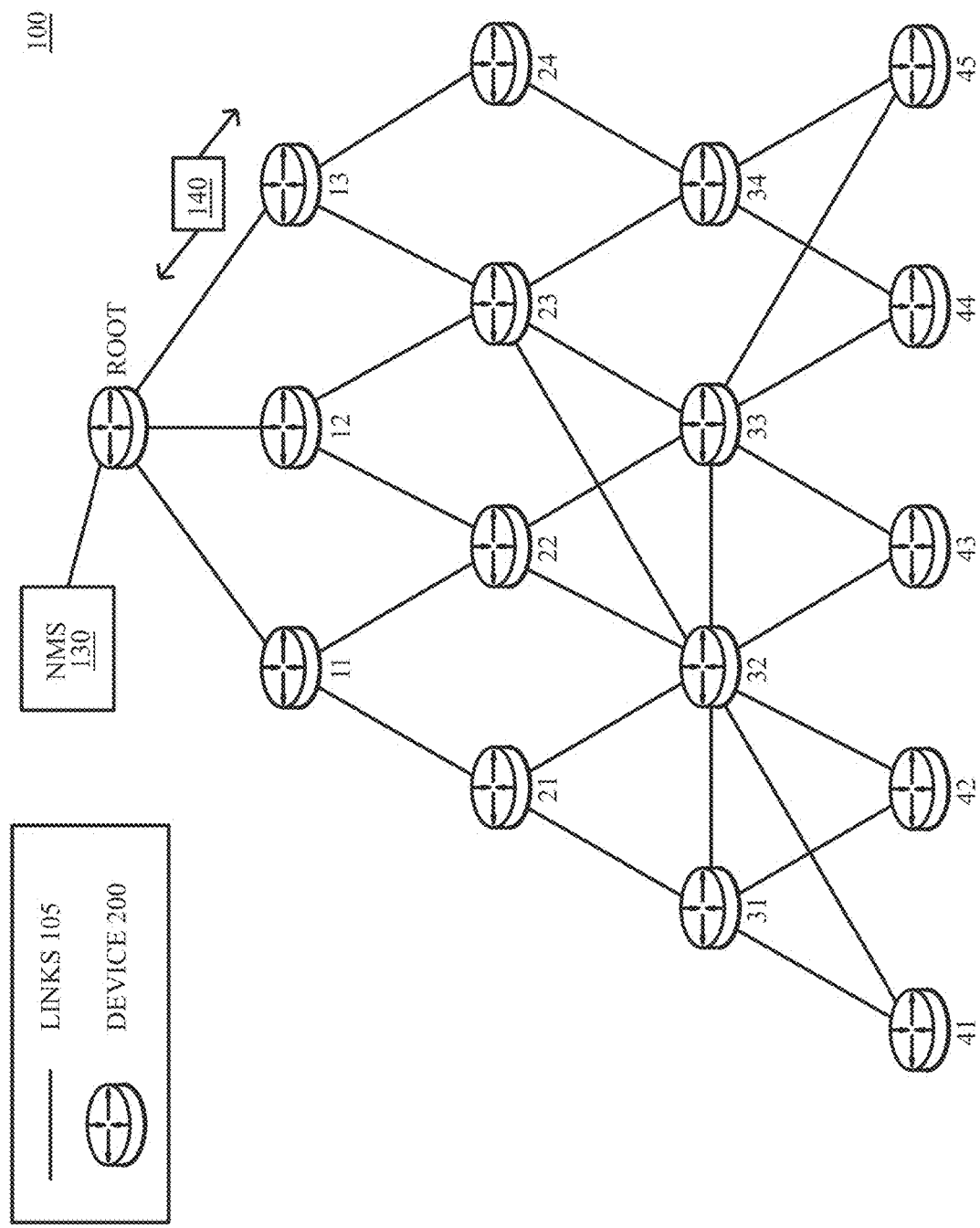
FIG. 1 is a diagram depicting an example communication network in accordance with certain example embodiments.

In a multiple interface, low power and lossy network comprising a plurality of devices, a sender device dynamically selects a data packet for including a transmission parameter request, in response to determining that an age value for a set of current transmission parameters associated with a recipient device has expired or is expiring. For example, when a sender device determines it has a data packet that needs to be transmitted to a neighboring recipient device, the sender device looks up the transmission parameters associated with that recipient device in a transmission parameter table stored on the sender device. If the time since the last update to the transmission parameters, or age of the transmission parameters, has exceeded or will exceed a defined threshold value, then the sender device initiates a process to select a data packet suitable for including the transmission parameter request. While selecting a suitable data packet, the sender device may continue to transmit other data packets to the recipient device using the current transmission parameters. After selecting a suitable data packet for including the transmission parameter request, the sender device sets the transmission parameter request in the data packet and communicates the data packet to the recipient device. The sender device receives a transmission parameter response from the recipient device comprising updated transmission parameters, and then updates the transmission parameters associated with that recipient device.

Description

Referring to the drawings, in which like numerals represent like (but not necessarily identical) elements throughout the figures, example embodiments are described.

A computer network is a geographically distributed collection of nodes interconnected by communication links and segments for transporting data between end nodes. Nodes and end nodes include, for example, personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network that is generally considered a self-configuring network of mobile routes (and associated hosts) connected by wireless links, the union of which forms an arbitrary topology.

Smart object networks, such as sensor networks, are a specific type of network having spatially distributed autonomous devices, such as sensors, actuators, etc., that cooperatively monitor physical or environmental conditions at different locations, such as, for example, energy/power consumption, resource consumption (for example, water/gas/etc. for advanced metering infrastructure or "AMI" applications), temperature, pressure, vibration, sound, radiation, motion, pollutants, etc. Other types of smart objects include actuators, for example, responsible for turning on/off an engine or performing any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port (such as PLC), a microcontroller, and an energy source (such as a battery). Often, smart object networks are considered field area networks (FANs), neighborhood area networks (NANs), etc. Generally, size and cost constraints on smart object nodes (for example, sensors) result in corresponding constraints on resources, such as energy, memory, computational speed, and bandwidth.

Mesh networks have become increasingly popular and practical in recent years. In particular, shared-media mesh networks, such as wireless or PLC networks, etc., are often on what is referred to as Low Power and Lossy Networks (LLNs). LLNs are a class of network in which both the routers and their interconnects are constrained: LLN routers typically operate with constraints (for example, processing power, memory, and/or energy (battery)), and their interconnects are characterized by, illustratively, high loss rates, low data rates, and/or instability. LLNs are comprised of anything from a few dozen or up to thousands or even millions of LLN routers. Additionally, LLN's support point-to-point traffic (between devices inside the LLN), point-to-multipoint traffic (from a central control point, such as the root node, to a subset of devices inside the LLN), and multipoint-to-point traffic (from devices inside the LLN towards a central control point).

Loosely, the term "Internet of Things" or "IoT" may be used by those in the network field to refer to uniquely identifiable objects (things) and their virtual representations in a network-based architecture. In particular, the next frontier in the evolution of the Internet is the ability to connect more than just computers and communications devices, but also the ability to connect "objects" in general, such as lights, appliances, vehicles, HVAC (heating, ventilating, and air-conditioning), windows, window shades, and blinds, doors, locks, etc. The "Internet of Things" thus generally refers to the interconnection of objects (for example, smart objects), such as sensors and actuators, over a computer network (for example, internet protocol ("IP")), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, building and industrial automation, and cars (for example, that can interconnect millions of objects for sensing things like power quality, tire pressure, and temperature, and that can actuate engines and lights), it has been of the utmost importance to extend the IP protocol suite for these networks.

FIG. 1 is a schematic block diagram of an example computer network 100 illustratively comprising nodes/devices 200 (for example, labeled as shown, "root," "11," "12," . . . "45," and described in FIG. 2 below) interconnected by various methods of communication. For instance, the links 105 may be wired links or shared media (for example, wireless links, PLC links, etc.) where certain nodes 200 (such as, for example, routers, sensors, computers, etc.) may be in communication with other nodes 200, for example, based on distance, signal strength, current operational status, location, etc. Those skilled in the art will understand that any number of nodes, devices, links, etc. may be used in the computer network 100 and that the view illustrated herein is for simplicity. Also, those skilled in the art will further understand that while the network 100 is shown in a certain orientation, particularly with a "root" node, the network 100 is merely an example illustration that is not meant to limit the disclosure. In addition, a network management server (NMS) 130, or other head-end application device located beyond the root device (for example, via a WAN), may also be in communication with the network 100.

Data packets 140 (for example, traffic and/or messages sent between the devices/nodes) may be exchanged among the nodes/devices of the computer network 100 using predefined network communication protocols, such as certain known wired protocols, wireless protocols (for example, IEEE Std. .15.15.4, WiFi, Bluetooth®, etc.), PLC protocols, or other shared-media protocols where appropriate. In this context, a protocol comprises of a set of rules defining how the nodes interact with each other.

Figure 2:
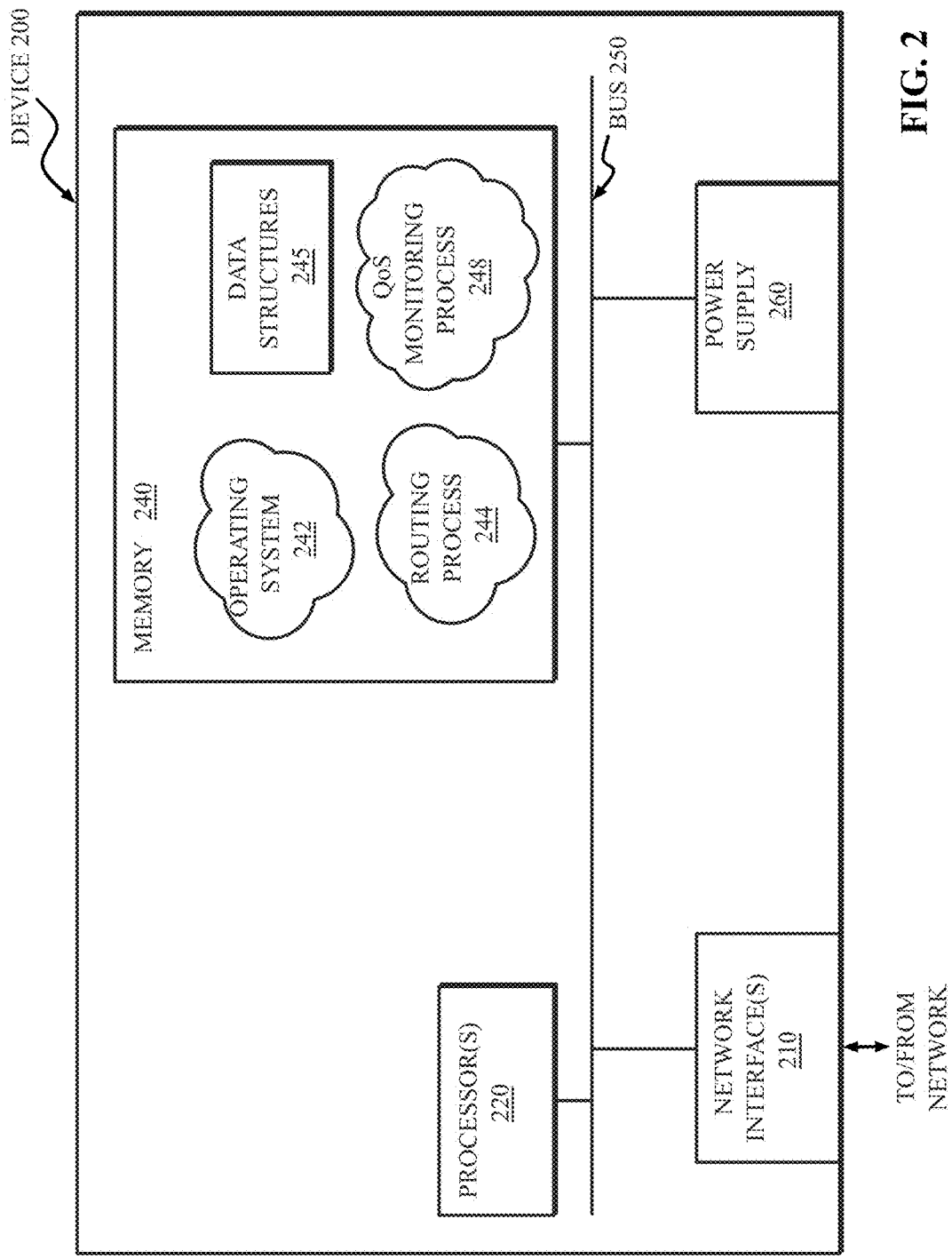
FIG. 2 is a block diagram depicting an example network device/node in accordance with certain example embodiments.

FIG. 2 is a schematic block diagram of an example node/device 200 that may be used with one or more embodiments described herein, for example, as any of the nodes shown in FIG. 1 above. The device 200 may comprise one or more network interfaces 210 (for example, wired, wireless, PLC, etc.), at least one processor 220, and a memory 240 interconnected by a system bus 250, as well as a power supply 260 (for example, battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes 200 may have multiple types of network connections, for example, wireless and wired/physical connections, and that the view depicted herein is merely for illustration. Also, while the network interface 210 is shown separately from the power supply 260, the network interface 210 may communicate through the power supply 260 or may be an integral component of the power supply, for example, for PLC. In some specific configurations, the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (for example, no memory for storage other than for programs/processes operating on the device and associated caches). The processor 220 may comprise hardware elements or hardware logic adapted to execute the software programs and manipulate the data structures 245.

An operating system 242, portions of which are typically resident in memory 240 and executed by the processor 220, functionally organizes the device by, inter alia, invoking operations in support of software processes and/or services executing on the device. These software processes and/or services may comprise routing process/services 244 and an illustrative "QoS monitoring" process 248, as described herein. Note that while QoS monitoring process 248 is shown in centralized memory 240, alternative embodiments provide for the process to be specifically operated within the network interfaces 210, such as a component of a network layer operation within the network interfaces 210 (as process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (for example, according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols, as will be understood by those skilled in the art. These functions may, on capable devices, be configured to manage a routing/forwarding table (a data structure 245) containing, for example, data used to make routing/forwarding decisions. In particular, in proactive routing, connectivity is discovered and known prior to computing routes to any destination in the network, for example, using link state routing such as Open Shortest Path First (OSPF), Intermediate-System-to-Intermediate-System (ISIS), or Optimized Link State Routing (OLSR). Reactive routing, on the other hand, discovers neighbors (in other words, it does not have an a priori knowledge of network topology) and, in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), for example, certain sensor networks, may be used in a myriad of applications, such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, for example, considerably affecting bit error rate (BER);
2) Links are generally low bandwidth, such that control plane traffic must generally be bounded and negligible compared to the low rate data traffic;
3) A number of use cases require specifying a set of link and node metrics, some of them being dynamic, thus requiring specific smoothing functions to avoid routing instability, which considerably drains bandwidth and energy;
4) Constraint-routing may be required by some applications, for example, to establish routing paths that will avoid non-encrypted links, nodes running low on energy, etc.;
5) Scale of the networks may become very large, for example, on the order of several thousands to millions of nodes; and
6) Nodes may be constrained with low memory, a reduced processing capability, a low power supply (for example, battery), etc.

An example implementation of LLNs is an "Internet of Things" network. As described above, the term "Internet of Things" or "IoT" may be used by those in the art to refer to uniquely identifiable objects (things) and their virtual representations in a network-based architecture.

One example protocol is specified in Internet Engineering Task Force (IETF) Proposed Standard, Request for Comment (RFC) 6550, entitled "RPL: IPv6 Routing Protocol for Low Power and Lossy Networks" by Winter, et al. (March 2012). This protocol provides a mechanism that supports multipoint-to-point (MP2P) traffic from devices inside the LLN towards a central control point (for example, LLN Border Routers (LBRs) or "root nodes/devices" generally), as well as point-to-multipoint (P2MP) traffic from the central control point to the devices inside the LLN (and also point-to-point or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are contained in paths oriented toward and terminating at one or more root nodes (for example, "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, in other words, at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (for example, the farther away a node is from a root, the higher the rank of that node). Further, in certain embodiments, a sibling of a node within a DAG may be defined as any neighboring node that is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (for example, by a DAG process) based on an Objective Function (OF). The role of the objective function is generally to specify rules on how to build the DAG (for example, number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. Alternatively, the constraints and metrics may be separated from the objective function. Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc. are considered "DAG parameters."

Illustratively, example metrics used to select paths (for example, preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (for example, wired, wireless, etc.), etc. The objective function may provide rules defining the load balancing requirements, such as a number of selected parents (for example, single parent trees or multi-parent DAGs). Notably, an example for how routing metrics and constraints may be obtained may be found in an IETF Internet Draft, entitled "Routing Metrics used for Path Calculation in Low Power and Lossy Networks" <draft-ietf-roll-routing-metrics-19> by Vasseur, et al. (Mar. 1, 2011 version). Further, an example objective function (for example, a default objective function) may be found in an IETF RFC, entitled "RPL Objective Function 0"<RFC 6552> by Thubert (March 2012 version) and "The Minimum Rank Objective Function with Hysteresis"<RFC 6719> by O. Gnawali et al. (September 2012 version).

Building a DAG may utilize a discovery mechanism to build a logical representation of the network and a route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, for example, following the orientation of the edges within the DAG. Conversely, "downward" or "down" paths are routes that lead in the direction from DAG roots towards leaf nodes, for example, generally going in the opposite direction to the upward messages within the DAG.

Generally, a DAG discovery request (for example, DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (for example, DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
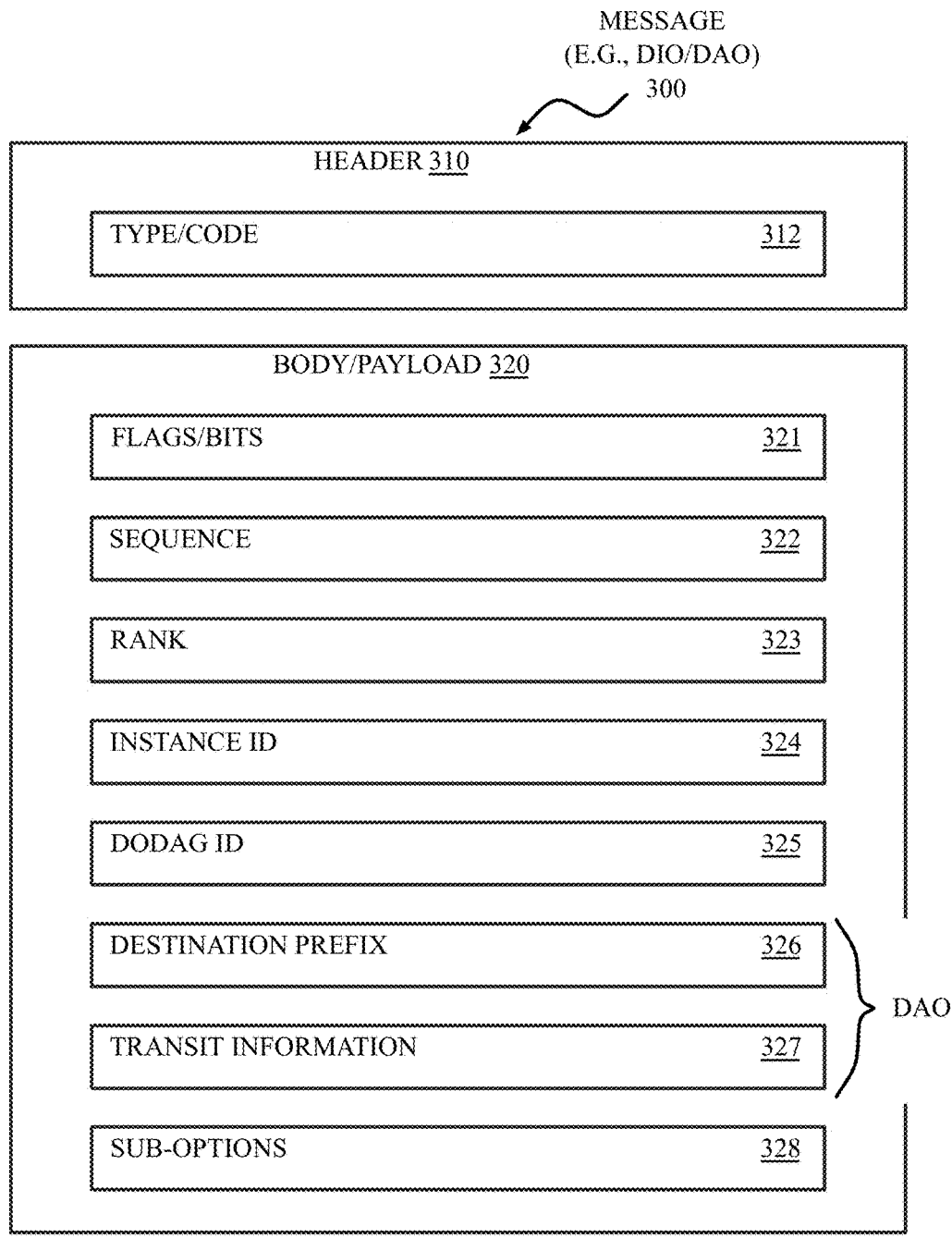
FIG. 3 is a block diagram depicting a packet header and payload organization in accordance with certain example embodiments.

FIG. 3 illustrates an example simplified control message format 300 that may be used for discovery and route dissemination when building a DAG, for example, as a DIO, DAO, or DIS message. Message 300 illustratively comprises a header 310 with one or more fields 312 that identify the type of message (for example, a RPL control message) and a specific code indicating the specific type of message, for example, a DIO, DAO, or DIS. Within the body/payload 320 of the message may be a plurality of fields used to relay pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (for example, DAO Sequence used for acknowledgements (ACKs), etc.). For any type of message 300, one or more additional sub-option fields 328 may be used to supply additional or custom information within the message 300. For instance, an objective code point (OCP) sub-option field may be used within a DIO to carry codes specifying a particular objective function to be used for building the associated DAG. Alternatively, sub-option fields 328 may be used to carry other information within a message 300, such as indications, requests, capabilities, lists, notifications, etc., for example, in one or more type-length-value (TLV) fields.

Figure 4:
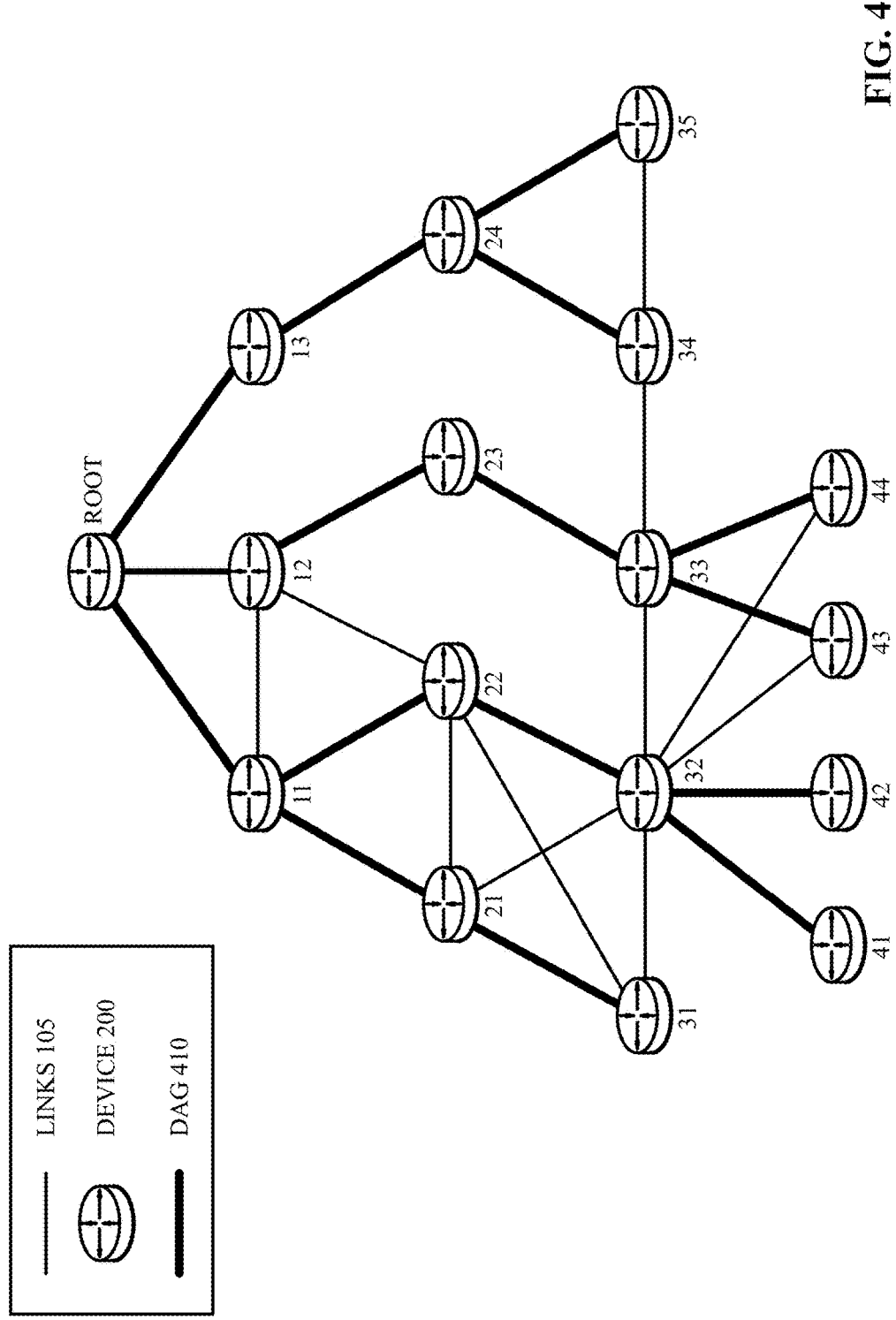
FIG. 4 is a diagram depicting a directed acyclic graph defined within a computer network in accordance with certain example embodiments.

FIG. 4 illustrates an example simplified DAG that may be created, for example, through the techniques described above, within the network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein. Note that although certain examples described herein relate to DAGs, the embodiments of the disclosure are not so limited and may be based on any suitable routing topology, particularly for constrained networks.

As noted above, shared-media communication networks, such as wireless and power-line communication (PLC) networks (a type of communication over power-lines), provide an enabling technology for networking communication and can be used for example in Advanced Metering Infrastructure (AMI) networks, and are also useful within homes and buildings. Interestingly, PLC lines share many characteristics with low power radio (wireless) technologies. In particular, though each device in a given PLC network may be connected to the same physical power-line, due to their noisy environment, a PLC link provides limited range and connectivity is highly unpredictable, thus requiring multi-hop routing when the signal is too weak. For instance, the far-reaching physical media exhibits a harsh noisy environment due to electrical distribution transformers, commercial and residential electric appliances, and cross-talk effects. As an example, even within a building, the average number of hops may be between two and three (even larger when having cross phases), while on an AMI network on the same power phase line the number of hops may vary during a day between one and 15-20. Those skilled in the art would thus recognize that due to various reasons, including long power lines, interferences, etc., a PLC connection may traverse multiple hops. In other words, PLC cannot be seen as a "flat wire" equivalent to broadcast media (such as Ethernet), since they are multi-hop networks by essence.

Furthermore, such communication links are usually shared (for example, by using wireless mesh or PLC networks) and provide a very limited capacity (for example, from a few Kbits/s to a few dozen Kbits/s). LLN link technologies typically communicate over a physical medium that is strongly affected by environmental conditions that change over time. For example, LLN link technologies may include temporal changes in interference (for example, other wireless networks or electric appliances), spatial/physical obstruction (for example, doors opening/closing or seasonal changes in foliage density of trees), and/or propagation characteristics of the physical media (for example, changes in temperature, humidity, etc.). The timescale of such temporal changes may range from milliseconds (for example, transmissions from other wireless networks) to months (for example, seasonal changes of outdoor environment). For example, with a PLC link the far-reaching physical media typically exhibits a harsh noisy environment due to a variety of sources including, for example, electrical distribution transformers, commercial and residential electric appliances, and cross-talk effects. Real world testing suggests that PLC link technologies may be subject to high instability. For example, testing suggests that the number of hops required to reach a destination may vary between 1 and 17 hops during the course of a day, with almost no predictability. It has been observed that RF and PLC links are prone to a number of failures, and it is not unusual to see extremely high Bit Error Rates (BER) with packet loss that may be as high as 50-60%, coupled with intermittent connectivity.

As further noted above, many LLNs, particularly AMI networks, demand that many different applications operate over the network. For example, the following list of applications may operate simultaneously over AMI networks:

1) Automated Meter Reading that involves periodically retrieving meter readings from each individual meter to a head-end server;
2) Firmware upgrades, for example, that involve communicating relatively large firmware images (often 500 KB or more) from a head-end server to one device, multiple devices, or all devices in the network;
3) Retrieving load curves;
4) Real-time alarms generated by meters (for example, power outage events) that actually act as sensors;
5) Periodically retrieving network management information from each meter to a Network Management System (NMS) 130;
6) Supporting demand response applications by sending multicast messages from a head-end device to large numbers of meters;
7) Etc.

One of skill in the art will appreciate that the above-enumerated examples are similar for other types of LLNs.

Generally speaking, these different applications have significantly different traffic characteristics, for example, unicast vs. multicast, small units of data vs. large units of data, low-latency vs. latency-tolerant, flows toward a head-end vs. away from the head-end, etc. Furthermore, since these applications must operate simultaneously over a highly constrained LLN network, the network can easily experience congestion, especially when different applications are sending traffic simultaneously. For example, the bandwidth of LLN links may be as low as a few Kbits/s, and even lower when crossing transformers (for PLC). Without proper mechanisms, these situations can cause networks to violate critical service layer agreements (SLAs), for example, delaying the reception of critical alarms from a meter. Accordingly, Quality of Service (QoS) mechanisms are a critical functionality in shared-media communication networks, particularly in highly constrained LLNs.

Numerous QoS mechanisms have been developed for "classic" IP networks (unconstrained), including: (1) packet coloring and classification (for example, by applications or Edge network entry points), (2) congestion avoidance algorithms with random drops for back-pressure on Transmission Control Protocol (TCP) (for example, WRED, etc.), (3) queuing techniques (for example, preemptive queuing+round robin+dynamic priorities), (4) bandwidth reservation (for example, Diffsery (by CoS), Intsery (RSVP(-TE), etc.), (5) Input/Output shaping (for example, congestion-based traffic shaping), (6) Call Admission Control (CAC) using protocols such as the Resource reSerVation Protocol (RSVP) and/or input traffic shapers, (7) Traffic Engineering, and (8) Congestion Avoidance techniques, etc. However, while some of these techniques may apply to LLNs, most are not suitable because they are too costly in terms of bandwidth (control plane overhead), memory (state maintenance), and/or CPU processing. Indeed, policies must be specified for packet coloring, and queuing techniques and congestion avoidance algorithms, such as WRED, must be configured on nodes. Such algorithms require a deep knowledge of traffic patterns, link layer characteristics, and node resources with respect to a number of parameters to configure each individual device.

Figure 5:
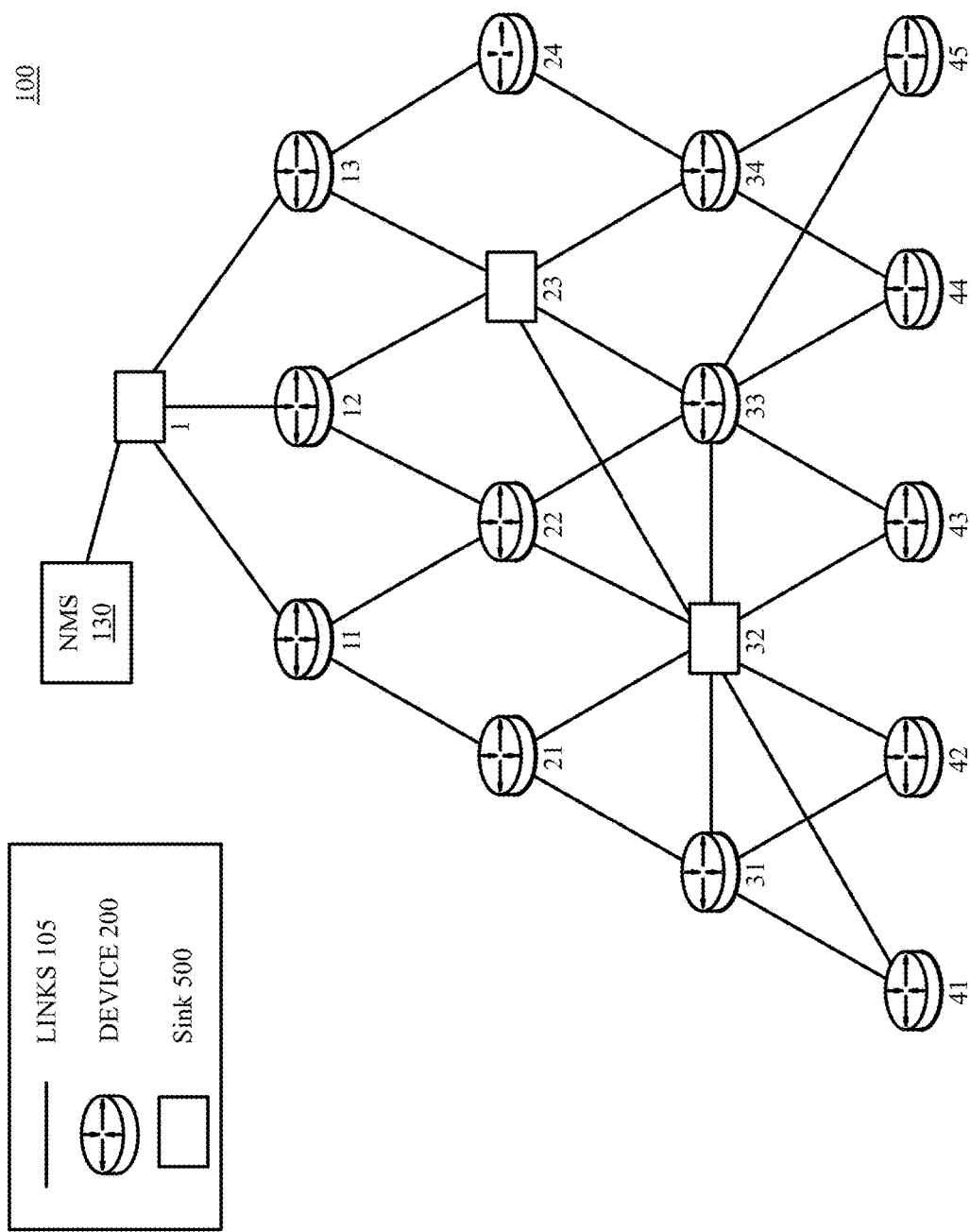
FIG. 5 is a block diagram depicting an example communication network in accordance with certain alternative example embodiments.

Although the techniques described herein are illustrated with respect to an LLN in which network traffic transits through the root/LBR, it should be noted that the techniques described herein may be generally applied to any network, particularly to any constrained network. For example, as shown in FIG. 5, a network 100 that does not have a central node through which all traffic is piped (for example, like the LBR of an LLN), may have one or more sinks 500 that reside at strategic locations throughout the network (for example, nodes 1, 23, and 32) to ensure that all potential traffic within the network may be monitored and routed according to the techniques described herein. In such an environment, the sinks may operate independently or in collaboration (for example, with each other or with an NMS) to perform the techniques described herein.

The techniques described herein may be performed by hardware, software, and/or firmware, such as in accordance with the "QoS monitoring" process 248/248a shown in FIG. 2, which may contain computer executable instructions executed by the processor 220 (or independent processor of interfaces 210) to perform functions relating to the techniques described herein, for example, in conjunction with routing process 244. For example, the techniques herein may be treated as extensions to conventional protocols, such as the various PLC protocols or wireless communication protocols, and as such, may be processed by similar components understood in the art that execute those protocols.

Dynamic Frame Selection when Requesting Tone Map Parameters in Mesh Networks

Power line communication (PLC) technology is an important link technology for LLNs, especially in dense urban environments. PLC technologies are especially challenging since their environments are known to experience unpredictable noise that depends on factors such as the quality of the electric lines and the types of electric devices attached to the grid.

To help achieve greater throughput and robustness in a noisy environment, IEEE P1901.2 relies on Orthogonal Frequency Division Multiplex (OFDM). OFDM utilizes additional bandwidth by allowing transmission of multiple data streams across orthogonal subcarriers simultaneously to increase throughput. With optimal erasure codes, the data frame, or packet, is encoded across multiple subcarriers to tolerate erasure codes that affect multiple subcarriers at the same time and individual subcarriers across time. In addition, a repetition code (called ROBO mode in P1901.2) may also be applied to provide greater robustness at the cost of throughput.

Adaptive Tone Mapping is a process that dynamically selects which subcarriers and coding parameters to use when transmitting a data packet. The goal of Adaptive Tone Mapping is to maximize overall throughput by choosing a modulation and identifying subcarriers that offer an acceptable signal-to-noise ratio (SNR). Adjusting the modulation, code-rate, and number of subcarriers can vastly change the effective throughput of the link. For IEEE P1901.2 in the CENELEC A band (Europe), the effective throughput can range from 2.4 kbps to 34.2 kbps more than an order of magnitude difference.

IEEE P1901.2 currently specifies the Adaptive Tone Mapping process as follows:
1) When sending a data packet to a neighboring node, first a sender device finds the neighbor's entry in the neighbor table and obtains the transmission parameters (for example, modulation, code-rate, and subcarriers).
2) If no neighbor table entry exists or the neighbor's age parameter exceeds a threshold, (i) a sender device initializes the transmission parameters to a base transmission parameter set (for example, the slowest data rate possible using all subcarriers) and (ii) sets a transmission parameter request in the data packet's header, for example, a Tone Map Request (TMREQ) bit.
3) When receiving a data packet with a transmission parameter request, a recipient device evaluates the signal-to-noise ratio (SNR) across all subcarriers, and chooses the modulation, code-rate, and subcarrier set that maximizes overall throughput. The recipient device provides the transmission parameters back to the sender device in a in a transmission parameter response.
4) When receiving a transmission parameter response, the sender device stores the updated transmission parameters in the neighbor table and resets the age value.

IEEE P1901.2 requires any data packet that includes a transmission parameter request to be sent utilizing a set of base transmission parameters, such as ROBO mode (2FSK modulation, Reed-Solomon with repetition coding, across all subcarriers.) The base transmission parameters offer the slowest data rate (2.4 kbps in the CENELEC A band). Accordingly, the base transmission mode (i) maximizes the effective range and (ii) allows the recipient device to evaluate the SNR across all subcarriers. However, the base transmission parameters may be used at the cost of minimizing overall throughput. As currently specified, IEEE P1901.2 periodically sends an arbitrary data packet using ROBO mode without regard to the size of the data packet. As a result, the cost of the Adaptive Tone Mapping process is dependent on the size of the next data packet that occurs after the valid lifetime of the parameters expire.

According to the techniques described herein, the cost of Adaptive Tone Mapping may be reduced by dynamically selecting data packets to use when requesting transmission parameters.

In an example embodiment, a sender devices utilizes the age of a set of transmission parameters associated with a neighboring receipt device as a soft indicator of when to request updated transmission parameters from the recipient device. That is, even if the transmission parameter age increases beyond a set threshold, the device does not reset the transmission parameters to base transmission parameters. When sending a data packet without a transmission parameter request, the sender device may continue to use the current transmission parameters associated with the recipient device. This process is in contrast to IEEE P1901.2, which automatically resets the transmission parameters to the base transmission parameters upon expiration of the current transmission parameters. Instead, according to techniques described herein, the transmission parameters are updated (i) when a transmission parameter response is properly received or (ii) successive data packets with a transmission parameter request are sent without receiving a transmission parameter response in return. In certain example embodiments, the latter case may indicate that communication is no longer possible since even transmission using the robust base transmission parameters was not successful in delivering data packets.

In another example embodiment, the sender device may perform a "look-ahead" when selecting a data packet to set the transmission parameter request. For example, the sender device may scan its own output queue for the smallest data packet and set the transmission parameter request in that data packet. This is in contrast to IEEE P1901.2, which simply picks the next outgoing data packet regardless of size. In certain example embodiments, the output queue may or may not provide enough visibility into future frames depending on implementation and resource constraints. In cases where it does not provide enough visibility, embodiments of the present disclosure include additional techniques described below.

In yet another example embodiment, the age value is used as an input parameter for a size threshold function. In one embodiment, the decision function may map a current transmission parameter age and data packet size thresholds to determine which data packet to set the transmission parameter request in. As the transmission parameter age increases, the size threshold for choosing a data packet increases. In other words the size of a given data packet that may be deemed suitable for including a transmission parameter request increases the longer the sender device waits to select a data packet. In another embodiment, the decision function may map the transmission parameter age and a probability function based on the size of a candidate data packet. In other words, the function takes the current transmission parameter age and data size of a candidate data packet and outputs a probability value. In certain embodiments, the sender device may then perform a coin-toss function based on the probability value to determine if it should set the transmission parameter request in the candidate data packet.

In one example embodiment, a sender device provides a request to a second sender software layer for a small data packet for the sender device to use in transmitting the transmission parameter request to the recipient device. In certain embodiments the second software layer may be implemented as a separate device. For example, a routing protocol executed by a higher software layer may generate small control packets to determine the reachability of neighboring devices and evaluate link quality. These control packets are often smaller than application data packets. The second sender software layer may respond to the request from the sender device immediately by providing a small data packet to the first sender software layer. Alternatively, the request to the second software layer may include an acceptable time window for receiving the small data packet, allowing the software layer time to make additional scheduling optimizations. In certain example embodiments, the software layer is a higher level device. A higher level device may operate may be a separate device that utilizes a higher software layer or the same software layer as the sender device. In yet another embodiment, the lower layer or lower layer devices may provide feedback to the higher layer to allow the higher layer to adjust the frequency that the higher layer sends control packets. The lower layers may provide feedback based on the configured transmission parameter age threshold, variability in evaluated tone map, and/or observed size of data packets being sent by the devices in a particular link layer.

In another example embodiment, a sender device generates a separate control packet if an existing data packet of suitable size is not available from a software layer. For example, if the transmission parameter age (or the data packet size function based on the age parameter) exceeds a threshold, the sender device may determine that it is more cost effective to generate a separate control frame. Thus, if other software layers are only generating large data packets, the sender device may determine that sending a small control frame using the base transmission parameters, followed by transmitting a larger data packet using the current transmission parameters is more cost effective than setting the transmission parameter request in a large data packet, and transmitting the large data packet using the base transmission parameters.

In yet another example embodiment, the sender devices report statistics and performance metrics to a Field Area Router (FAR) or a Network Management System (NMS). Such statistics may include how often a device is sending data packets using base transmission parameters, the size of such data packets, and the variability in the tone map associated with the transmission parameters. In one embodiment, the information may be reported in a new TLV using the CSMP over CoAP. Such information may be used by the FAR and/or NMS to make parameter adjustments. For example, the FAR/NMS may choose to adjust the data packet size threshold or probability threshold used by sender devices when choosing a data packet to set the transmission parameter request.

Figure 6:
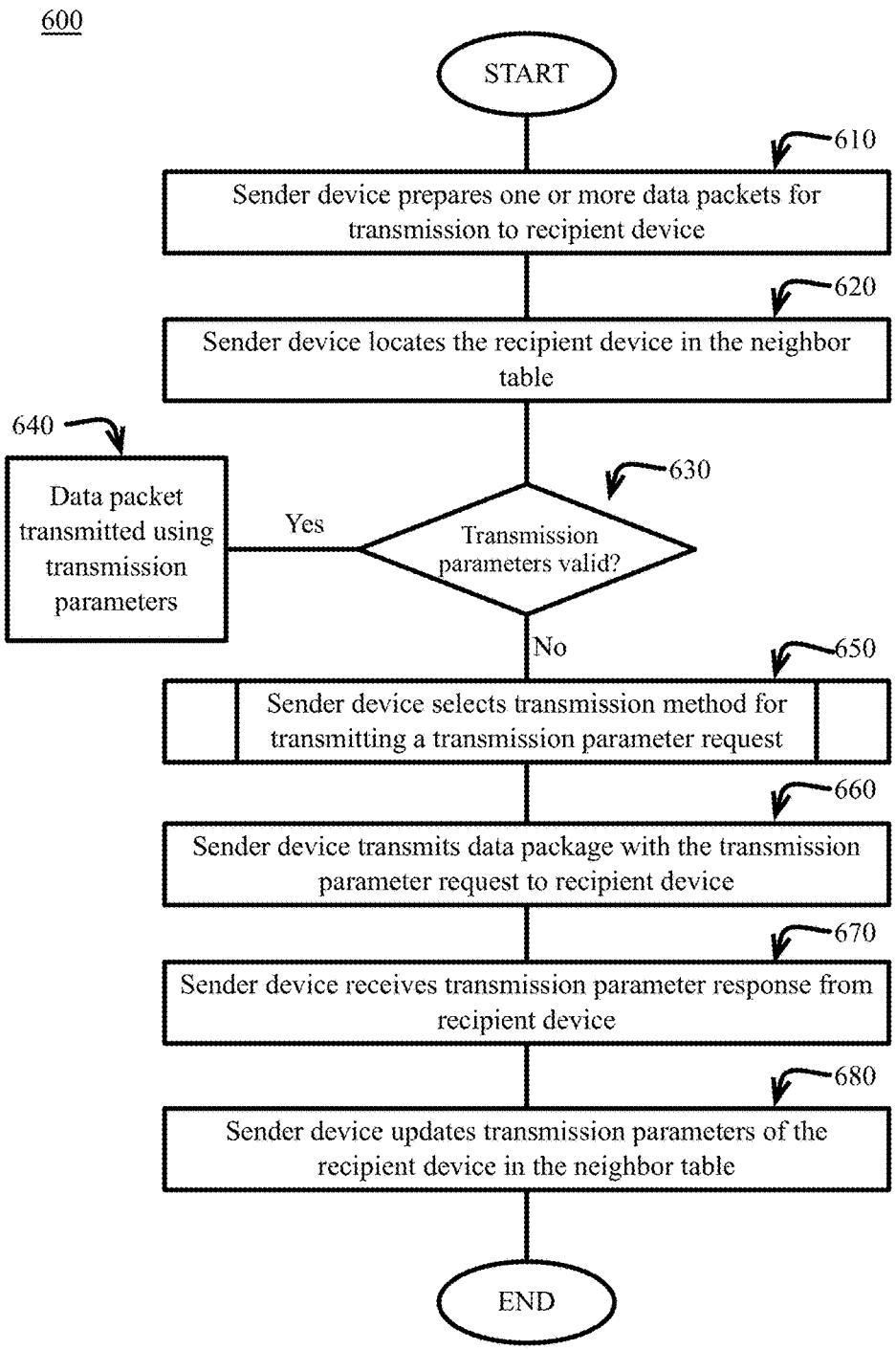
FIG. 6 is a block flow diagram depicting a method to send a transmission parameter request to a recipient device using a data packet transmitted from a sender device, in accordance with certain example embodiments.

FIG. 6 is a block flow diagram depicting a method 600 to send a transmission parameter request to a recipient device using a dynamically selected data packet, in accordance with certain example embodiments. The method 600 is described with reference to the components illustrated in FIGS. 1-5.

In an example embodiment, a device 200 is a sender device/node 200a that transmits one or more data packets to one or more recipient devices/nodes 200b over one or more network interfaces 210.

In block 610, the sender device 200a prepares one or more data packets for transmission to the recipient device 200b. The data packets may be of different sizes, and comprise different data types and control frames. The data packets may be received by the sender device 200a from any user or any suitable component in the network. The sender device 200a may store the data packets while awaiting re-transmission in a data queue in a memory module 240 or any suitable storage location.

In block 620, the sender device 200a locates the recipient device 200b in a neighbor table. The sender device 200a may maintain a neighbor table comprising the transmission parameters requested by one or more neighbor devices, such as the recipient device 200b. The transmission parameters may be a tone map comprising factors such as the modulation, code-rate, and subcarriers.

The transmission parameters additionally are associated with a date of recordation. For example, the time and date that the transmission parameters are transmitted and stored in the neighbor table are noted and stored with the data in the neighbor table. From the associated date of entry and current time and date, the sender device 200a is capable of calculating an age of the transmission parameters. The sender device 200a may store the transmission parameters and the associated date in a memory module 240 or any suitable storage location. The neighbor table may store any additional data needed to allow efficient transmission of data to the recipient device 200b.

The sender device 200a locates the entry in the neighbor table of the recipient device 200b by locating an entry that identifies the recipient device, such as an identification number or name. The sender device 200a extracts the transmission parameters and the age of the transmission parameters from the neighbor table. The age may be determined by subtracting the date of recordation of the transmission parameters from the current time and date.

In block 630, the age of the transmission parameters is compared to a configured age threshold to determine if the transmission parameters are valid. The age threshold may be configured by the sender device 200a, a system administrator, the recipient device 200b, or any component or operator of the network 100. The age threshold may be influenced by the type of devices 200 being used, the transmission network components, the data being transmitted, link quality variance, recent transmission success/failures, or any suitable factor. The sender device 200a compares the age associated with the transmission parameters to the configured threshold.

If the age of the transmission parameters is less than the threshold, then the method 600 proceeds from block 630 to block 640. In block 640, the data packet is transmitted using the transmission parameters associated with the recipient device 200b from the neighbor table. The transmission is received by the recipient device 200b. Based on configured parameters, the recipient device 200b may automatically transmit new transmission parameters to the sender device 200a. The decision whether to transmit new transmission parameters may be based at least in part on the age of the last transmission of the transmission parameters, or at the direction of a system administrator. Any suitable factor may initiate the transmission of the new transmission parameters. Alternatively, the recipient device 200b may only transmit new transmission parameters when a transmission parameters request is received from the sender device 200a.

Returning to block 630, if the age of the transmission parameters stored in the neighbor table is equal to or greater than the threshold, then the method proceeds from block 630 to block 650. In block 650, the sender device 200a selects a transmission method for transmitting a transmission parameters request to the recipient device 200b. In one example embodiment, the sender device 200a continues to transmit data packets for the recipient device in its queue using the current transmission parameters while it selects the transmission method for transmitting a transmission parameter request. The details of block 630 are discussed in greater detail in methods 650a and 650b of FIGS. 7 and 8, respectively.

Figure 7:
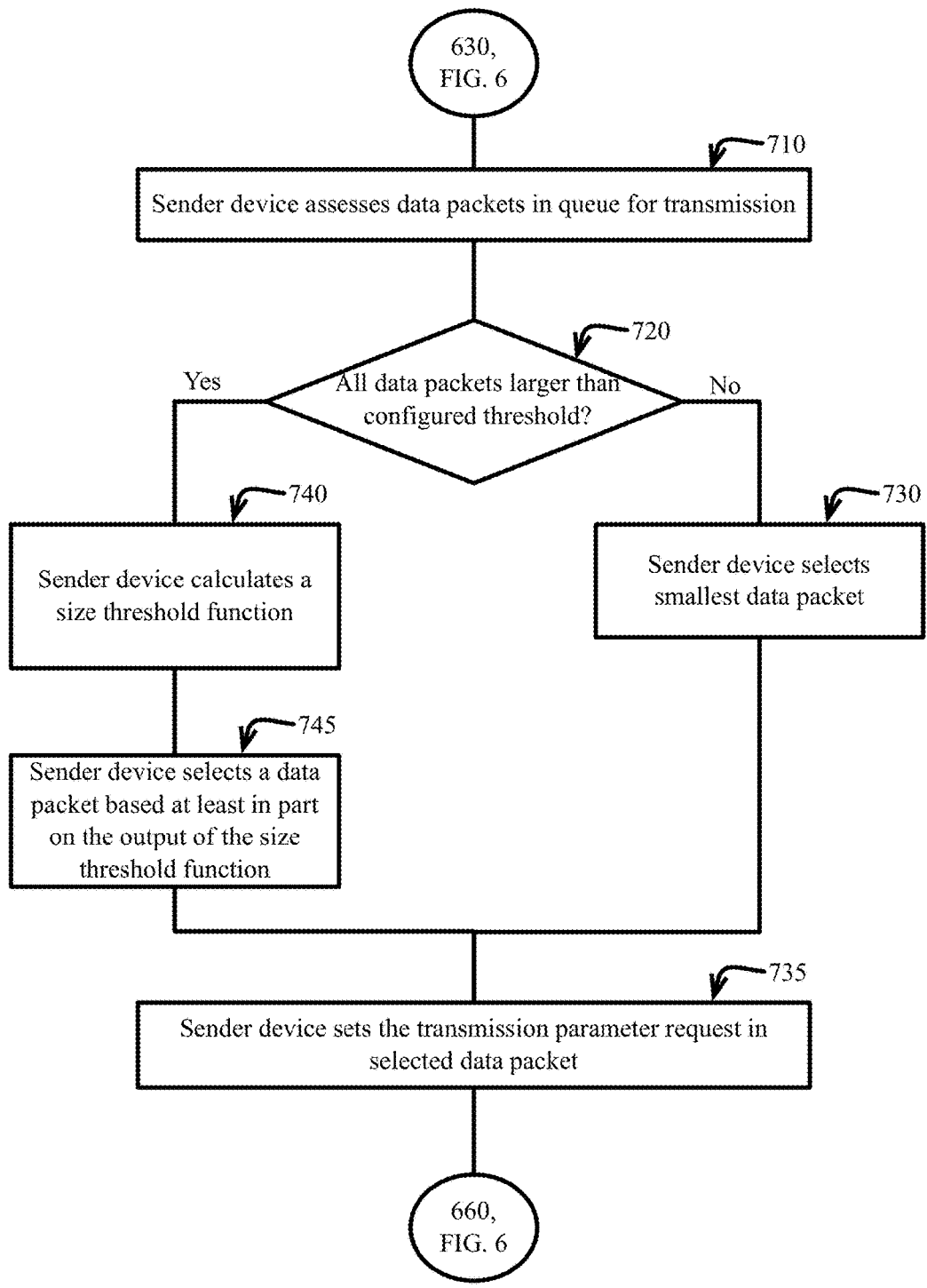
FIG. 7 is a block flow diagram depicting a method to select a data packet with which to include a transmission parameter request, in accordance with certain example embodiments.

FIG. 7 is a block flow diagram depicting a method 650a to select a data packet with which to transmit a transmission parameter request, in accordance with certain example embodiments. The method 650a is described with reference to the components illustrated in FIGS. 1-5.

In block 710, the sender device 200a assesses the data packets in the queue for transmission. The data packets are stored in a memory module 240 or any suitable storage location. The sender device 200a may evaluate the size and type of each data packet. The sender device 200a may compare the sizes of the data packets and produce a ranking of the data packet sizes. The ranking may be stored as a list or in another suitable format, such as a table.

In block 720, the sender device 200a determines if all of the data packets are larger than a configured data packet size threshold. The size threshold may be configured by the sender device 200a, a system administrator, the recipient device 200b, or any component or operator of the network 100. The size threshold may be influenced by the types of devices 200 being used, the transmission network components, the data being transmitted, link quality variance, recent transmission success/failures, or any suitable factor. The sender device 200a compares the size associated with the data packets to the configured threshold.

If at least one of the data packets is smaller than the configured threshold, then the method 650a proceeds from block 720 to block 730. In block 730, the sender device 200a selects the smallest data packet from the list or ranking of the data packets to set the transmission parameter request. The smallest data packet may be the data packet that has the smallest quantity of data to be transmitted, or the data packet that will transmit the fastest, for example, using the base transmission parameters.

Returning to block 720, if all of the data packets are larger than or equal to the configured threshold, then the method 650a proceeds from block 720 to block 740. In block 740, the sender device 200a calculate a size threshold function. The size threshold function may create a virtual grid or map.

The map allows the sender device 200a to perform a comparison of the age of the transmission parameters and either data size thresholds, or data packet sizes. The send device may then apply a selection algorithm to the map to select a preferred data packet. In one example embodiment, the size threshold function maps the current transmission parameter age and different data packet size thresholds. In another example embodiment, the size threshold function maps the current transmission parameter age and a probability value, the probability value determined by a probability function. In one example embodiment, the probability function uses the current transmission parameter age and the data size of a candidate data packet to generate the probability value. In certain example embodiments, the sender device may then executes a coin-toss function to determine if it should set the transmission value in the candidate data packet based at least in part on the probability value.

In block 745, the sender device 200a selects the best data packet based on the mapping of the transmission parameter age provided by the size threshold function. For example, as the transmission parameter age increases, the size threshold for choosing a data packet with which to include the request for transmission parameters may also increase. That is, if the age of transmission parameters is larger, such as twice as old as the threshold, then the sender device 200a may use a larger date packet despite the transmission time required. If the age is only slightly out of date, such as 10% over the threshold, then the sender device 200a may choose to wait for a smaller data packet to set the transmission parameter request.

From blocks 730 and 745, the method 650a proceeds to block 735. In block 735, the sender device 200a sets the transmission parameter request in the selected data packet. The transmission parameters request may be in a standard request form recognizable by the recipient device 200b. The request may be embedded in any suitable manner within the data packet. For example, the request may be included as a header in the data packet.

From block 735, the method 650a returns to block 660 of FIG. 6.

Figure 8:
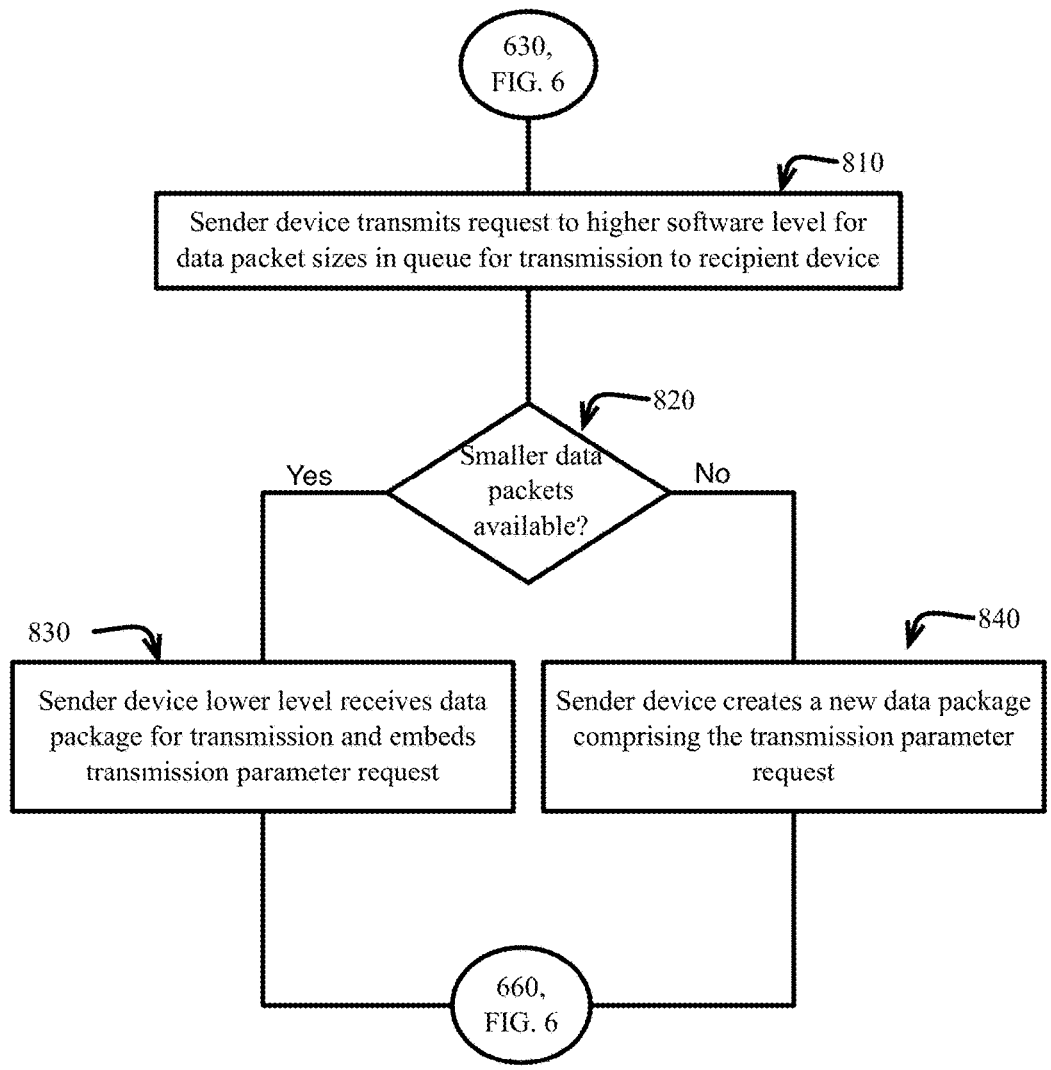
FIG. 8 is a block flow diagram depicting a method to select a data packet with which to include a transmission parameter request, in accordance with certain alternative example embodiments.

FIG. 8 is a block flow diagram depicting a method 650b to select a data packet with which to transmit a transmission parameter request, in accordance with certain alternative example embodiments. The method 650b is described with reference to the components illustrated in FIGS. 1-5.

In block 810, the sender device 200a transmits a request to a higher software layer for a small data packet within a suitable size range for sending the transmission parameter request. The data packets may be stored on the higher software layer or in another suitable location. In certain example embodiments, the higher software layer is a higher level device. A higher level device may operate as a separate device that utilizes a higher software layer or the same software layer as the sender device. A higher level device may refer to a device 200 in the network 100 with a lower rank than the sender device 200a. A higher software layer may be a separate software layer on the sender device 200a. A lower rank, as described above, indicates the higher layer device that is in closer proximity to a root device 200. A higher software layer may execute routing protocols that generate small control frames to determine the ability to reach neighboring devices and evaluate link quality. These control frames are often smaller than application data frames.

The sender device 200a may request either a list of data packets in the higher software layer (or device) queue or request information about the data packets, such as the size or type of data packet. The higher software layer may transmit the details of the data packets in the queue to the lower layer of the sender device 200a. In certain embodiments, the higher software layer may instead transmit a response that specifies if the data packets meet the requirements of the lower layer of the sender device 200a, such as a "yes" or "no" answer.

In block 820, the sender device 200a may analyze the data packet information to determine if the size of a data packet is below the configured size threshold. The sender device 200a may analyze the data packets, a list of data packet sizes provided by the higher software layer, or the response of the higher software layer, such as the yes or no response.

If the size of a data packet in the queue of the higher software layer (or device) is below the threshold, then the method 650b proceeds to block 830. In block 830, the sender device 200a selects the smallest available data packet from the higher software layer. The sender device 200a receives the selected data package for transmission and sets the transmission parameter request in the data package. In one embodiment, the sender device 200a identifies the preferred data package and requests that the data package be routed through the lower layer of the sender device 200a to the recipient device 200b. Upon receipt of the data packet, the sender device 200a sets the transmission parameter request in the data packet and forwards the data package to the recipient device 200b. The transmission parameter request may be in a standard request form recognizable by the recipient device 200b. The request may be embedded in any suitable manner with the data packet. For example, the request may be included as a header in the data packet.

In another embodiment, the data packet may already be configured to route through the lower layer of the sender device 200a from a separate higher layer sender level (or device). After selecting the preferred data packet, the sender device 200a awaits the receipt of the preferred data packet from the higher software layer. Upon receipt of the data packet, the sender device 200a embeds the transmission parameter request into the data packet and forwards the data packet to the recipient device 200b.

In another embodiment, the sender device 200a requests that the higher software layer (or device) transmit the selected data packet to the lower layer of the sender device 200a out of the original order of the queue. For example, the sender device 200a may request that the second sender device move the selected data packet to the front of the queue.

If none of the data packets in the queue of a higher software layer are below the data size threshold, then the method 650b proceeds from block 820 to block 840. In block 840, the sender device 200a creates a new data package comprising the transmission parameter request. That is, if a higher software layer (or device) does not have a small data packet in its queue or does not create one, and the sender device 200a does not have a small data packet in its queue then the sender device 200a may create a separate data packet for sending the transmission parameter request to the recipient device 200b. The data packet may comprise no other data than the transmission parameter request. The data packet may be an empty data packet with the transmission parameter request embedded in it. Any suitable manner of creating a data packet for transmitting the transmission parameter request may be employed.

From block 830 and 840, the method 650b returns to block 660 of FIG. 6.

Returning to FIG. 6, in block 660, the sender device 200a transmits the data package with the transmission parameter request to recipient device. The transmission is sent using a base transmission parameter, such as ROBO. The sender device 200a identifies the base transmission parameters for the network shared by the sender device 200a and the recipient device 200b. Using the base transmission parameters may require the sender device 200a to alter one or more transmissions setting for the selected interface.

In block 670, the sender device 200a receives a transmission parameter response from recipient device 200b. The transmission parameter response may be a tone map comprising factors such as the modulation, code-rate, and sub-carriers. The response may be transmitted using the new transmission parameters or using the base transmission parameters. The response may include a date and time associated with the response or the sender device 200a may note the time and date of the receipt of the response.

In block 680, the sender device 200a records the transmission parameters and the time and date supplied by the recipient device 200b in the neighbor table. Subsequent transmissions with the recipient device 200b are conducted using the received transmission parameters until the age associated with the transmission parameters exceeds the threshold.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, an ordinarily skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be repeated, performed in a different order, in parallel with one another, omitted entirely, and/or combined between different example embodiments, and/or certain additional acts can be performed, without departing from the scope and spirit of various embodiments. Accordingly, such alternative embodiments are included in the invention claimed herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structure

What is claimed is:

1. A method, comprising:
    in a low power and lossy network (LLN) comprising one or more interfaces and a plurality of nodes, preparing, by a sender node, data for transmission to a recipient node via a communication medium;
    determining, by the sender node, an age value for a set of current transmission parameters, the current transmission parameters stored on the sender node and associated with the recipient node;
    determining, by the sender node, that the age value has exceeded a threshold value;
    selecting, by the sender node, a data packet in which to set a transmission parameter request in response to determining that the age value has exceeded the threshold value;
    setting, by the sender node, the transmission parameter request in the selected data packet;
    communicating, by the sender node, the data packet comprising the transmission parameter request to the recipient node using a set of base transmission parameters;
    receiving, by the sender node, a transmission parameter response from the recipient node, the response providing updated transmission parameters for the recipient node; and
    updating, by the sender node, the transmission parameters associated with the recipient node based on the updated transmission parameters in the transmission parameter response.

2. The method of claim 1, wherein the selecting step comprises selecting a data packet in a data queue on the sender node that is below a data packet size threshold.

3. The method of claim 1, wherein the selecting step comprises selecting a data packet based at least in part on a size threshold function, wherein the size threshold function maps thresholds for the age value of the current transmission parameters and data packet size.

4. The method of claim 3, wherein the size threshold function maps the age of the current transmission parameters and a probability value, wherein the probability value is determined based at least in part on data packet size.

5. The method of claim 1, wherein the selecting step comprises:
    communicating, by the sender node, a request for a small data packet to a second software layer;
    receiving, by the sender node, the small data packet from the second software layer for transmitting to the recipient node; and
    selecting, by the sender node, the small data packet received from the second software layer for setting the transmission parameter request to the recipient node.

6. The method of claim 1, wherein the selecting step comprises:
    transmitting, by the sender node, a request for a small data packet to a second software layer;
    determining, by the sender node, that the small data packet is not available from the second software layer; and
    in response to determining that the small data packet is not available, generating, by the sender node, a control data packet for setting the transmission parameter request.

7. The method of claim 1, wherein the set of base transmission parameters comprises a lower data rate than the current transmission parameters.

8. The method of claim 1, wherein the communication medium is a power line communication (PLC) medium.

9. The method of claim 1, wherein the LLN is a smart utility network.

10. The method of claim 1, further comprising transmitting, by the sender node, data packets to the recipient device that are not selected in the selecting step, wherein the non-selected data packets are transmitted using the current transmission parameters until the current transmission parameters are updated.

11. The method of claim 5, further comprising communicating a request to the second software layer to move the requested small data packet to the front of a data queue of the second software layer.

12. An apparatus, comprising:
    one or more network interfaces to communicate with a low power and lossy network (LLN);
    a processor coupled to the network interfaces and adapted to execute one or more processes; and
    a memory configured to store a process executable by the processor, the process when executed operable to:
        determine an age value for a set of current transmission parameters, the current transmission parameters stored on the sender node and associated with a recipient node;
        determine if the age value has exceeded a threshold value;
        select, in response to determining that the age value has exceeded the threshold value, a data packet in which to set a transmission parameter request;
        set the transmission parameter request in the selected data packet;
        transmit the selected data packet comprising the transmission parameter request to the recipient node using a set of base transmission parameters, wherein the base transmission parameters comprise a lower data rate than the current transmission parameters;
        receive a transmission parameter response from the recipient node, the transmission parameter response providing an updated set of transmission parameters for the recipient node; and
        update the current transmission parameters associated with the recipient node based on the updated transmission parameters in the transmission parameter response.

13. The apparatus of claim 12, wherein selecting a data packet comprises selecting a data packet from a data queue on the sender node that is below a data packet size threshold.

14. The apparatus of claim 12, wherein selecting a data packet comprises selecting a data packet based at least in part on a size threshold function, wherein the size threshold function maps the age value of the current transmission parameter set and data packet size thresholds.

15. The apparatus of claim 14, wherein the size threshold function maps the age of the current transmission parameters and a probability value, wherein the probability value is determined based at least in part on data packet size.

16. The apparatus of claim 12, wherein selecting a data packet comprises:
communicating a request for a small data packet to a second sender node;
receiving the requested small data packet from the second sender node; and
selecting the small data packet received from the second sender node for setting the transmission parameter request to the recipient node.

17. The apparatus of claim 12, wherein the process when executed is further operable to transmit data packets to the recipient node that are not selected to set the transmission parameter request, wherein the non-selected data packets are transmitted to the recipient node using the current transmission parameters until the current transmission parameters are updated.

18. The apparatus of claim 16, wherein selecting the data packet further comprises communicating a request to the second sender node to move the requested small data packet to the front of a data queue of the second sender node.

19. A tangible, non-transitory, computer-readable media having software encoded thereon, the software when executed by a processor operable to:
in a low power and lossy network comprising one or more interfaces and a plurality of nodes, prepare a data packet for transmission to a recipient node via a communication medium;
determine an age value for a set of current transmission parameters, the current transmission parameters stored on the sender node and associated with the recipient node;
determine that the age value has exceeded a threshold value;
select a data packet in which to set a transmission parameter request, the data packet marked for transmission to the recipient node in response to determining that the age value has exceeded the threshold value;
set the transmission parameter request in the selected data packet;
transmit the data packet comprising the transmission parameter request to the recipient node using a set of base transmission parameters, wherein the base transmission parameters comprise a lower data rate than the current transmission parameters;
receive a transmission parameter response from the recipient node, the transmission parameter response providing an updated set of transmission parameters for the recipient node; and
update the current transmission parameters associated with the recipient node based on the updated set of transmission parameters received in the transmission parameter response.

20. The computer-readable medium as in claim 19, wherein selecting a data packet comprises selecting a data packet from a data queue that is below a data packet size threshold.

21. The computer-readable medium as in claim 19, wherein selecting a data packet comprises selecting a data packet based at least in part on a size threshold function, wherein the size threshold function maps thresholds for the age value of the current transmission parameter set and either data packet size, or a probability value, wherein the probability value is determined based at least in part on a candidate data packet size.

22. The computer-readable medium as in claim 19, wherein the software when executed by the processor is further operable to:
transmit a request for a small data packet to a second sender node;
receive the small data packet from the second sender node; and
select the small data packet received from the second sender node for setting the transmission parameter request.

23. The computer readable medium as in claim 22, wherein the software when executed by the processor is further operable to communicate a request to the second sender node to move the requested small data packet to the front of a data queue of the second sender node.

* * * * *